(12) United States Patent
Hoying et al.

(10) Patent No.: US 10,542,862 B2
(45) Date of Patent: Jan. 28, 2020

(54) CLEANING PAD HAVING PREFERRED PERFORMANCE WITH SCRUBBING STRIP

(71) Applicant: The Procter & Gamble Company, Cincinnati, OH (US)

(72) Inventors: David John Hoying, Cincinnati, OH (US); Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 506 days.

(21) Appl. No.: 15/459,047

(22) Filed: Mar. 15, 2017

(65) Prior Publication Data

US 2017/0181595 A1 Jun. 29, 2017

Related U.S. Application Data

(63) Continuation-in-part of application No. 14/873,451, filed on Oct. 2, 2015, now Pat. No. 10,064,534, and a continuation-in-part of application No. 14/873,426, filed on Oct. 2, 2015, and a continuation-in-part of application No. 14/873,437, filed on Oct. 2, 2015, and (Continued)

(51) Int. Cl.
*A47L 13/16* (2006.01)

(52) U.S. Cl.
CPC .................................. *A47L 13/16* (2013.01)

(58) Field of Classification Search
CPC ... A47L 13/16; A47L 13/256; B32B 2250/44; B32B 2262/0253; B32B 2262/0261; B32B 2262/0276; B32B 2262/0284; B32B 2262/062; B32B 2262/14; B32B 2307/402; B32B 2307/538; B32B 2307/58; B32B 2307/718; B32B 2307/726; B32B 2307/7265; B32B 2307/728; B32B 2307/73; B32B 2307/732; B32B 2307/748; B32B 2432/00; B32B 27/065; B32B 27/12; B32B 27/14; B32B 27/32; B32B 3/06; B32B 3/08; B32B 3/266; B32B 5/022; B32B 5/16; B32B 5/18; B32B 5/245; B32B 5/26; B32B 5/30; B32B 7/04; B32B 7/05; B32B 7/12
See application file for complete search history.

(56) References Cited

U.S. PATENT DOCUMENTS 5,960,508 A * 10/1999 Holt .................... A47L 13/16
15/209.1
6,003,191 A * 12/1999 Sherry .................. A47L 13/16
15/209.1

(Continued)

FOREIGN PATENT DOCUMENTS

WO WO2002/41746 A2 5/2002

*Primary Examiner* — Marc Carlson
(74) *Attorney, Agent, or Firm* — John T. Dipre

(57) ABSTRACT

A cleaning pad for absorbing liquids from a hard, target surface. In one embodiment the cleaning pad comprises a pad having a floor sheet, and a core joined to the floor sheet. The floor sheet has a combination of polymeric synthetic fibers and natural cellulose fibers. A cleaning strip is joined to the outwardly facing surface of the floor sheet. The cleaning pad provides both good absorbency and a coefficient of friction falling within a specified range judged advantageous for cleaning. The absorbency and coefficient of friction work well with an amine oxide cleaning solution.

20 Claims, 4 Drawing Sheets

Related U.S. Application Data a continuation-in-part of application No. 14/873,409, filed on Oct. 2, 2015.

(56) References Cited

U.S. PATENT DOCUMENTS

| | | | |
|---|---|---|---|
| 6,048,123 A * | 4/2000 | Holt | A47L 13/16 15/209.1 |
| 6,101,661 A * | 8/2000 | Policicchio | A47L 13/16 15/228 |
| 6,110,848 A | 8/2000 | Bouchette | |
| 6,245,413 B1 * | 6/2001 | Kenmochi | A47L 13/20 15/209.1 |
| 6,601,261 B1 | 8/2003 | Holt et al. | |
| 6,681,434 B2 | 1/2004 | Smith | |
| 6,701,567 B2 | 3/2004 | Smith | |
| 6,996,871 B1 * | 2/2006 | Policicchio | A47L 13/20 15/209.1 |
| 7,037,569 B2 | 5/2006 | Curro et al. | |
| 7,096,531 B2 * | 8/2006 | Policicchio | A47L 13/16 15/144.2 |
| 7,163,349 B2 | 1/2007 | Policicchio et al. | |
| 7,458,128 B2 | 12/2008 | Smith et al. | |
| 7,480,956 B2 * | 1/2009 | Policicchio | A47L 13/16 134/6 |
| 7,624,468 B2 | 12/2009 | Reddy et al. | |
| 8,087,121 B1 * | 1/2012 | Michelson | A47L 13/14 15/119.2 |
| D673,745 S | 1/2013 | Pung et al. | |
| 8,341,797 B2 | 1/2013 | Young | |
| D692,631 S | 10/2013 | Pung et al. | |
| 8,707,505 B2 | 4/2014 | Maranghi et al. | |
| 9,204,775 B2 | 12/2015 | Pung et al. | |
| 10,064,534 B2 * | 9/2018 | Hoying | B32B 27/12 |
| 2003/0159226 A1 * | 8/2003 | Billat | A47L 1/15 15/220.1 |
| 2004/0068817 A1 * | 4/2004 | Policicchio | A47L 13/16 15/228 |
| 2004/0074520 A1 | 4/2004 | Truong et al. | |
| 2005/0133174 A1 | 6/2005 | Gorley et al. | |
| 2005/0153857 A1 * | 7/2005 | Sherry | A47L 13/20 510/295 |
| 2007/0107151 A1 * | 5/2007 | Pung | A47L 13/16 15/104.94 |
| 2012/0279005 A1 * | 11/2012 | Pung | A47L 13/12 15/104.94 |
| 2017/0095132 A1 * | 4/2017 | Tollens | A47L 13/256 |
| 2017/0095133 A1 * | 4/2017 | Hoying | A47L 13/22 |
| 2017/0095134 A1 * | 4/2017 | Hoying | B32B 5/022 |

* cited by examiner

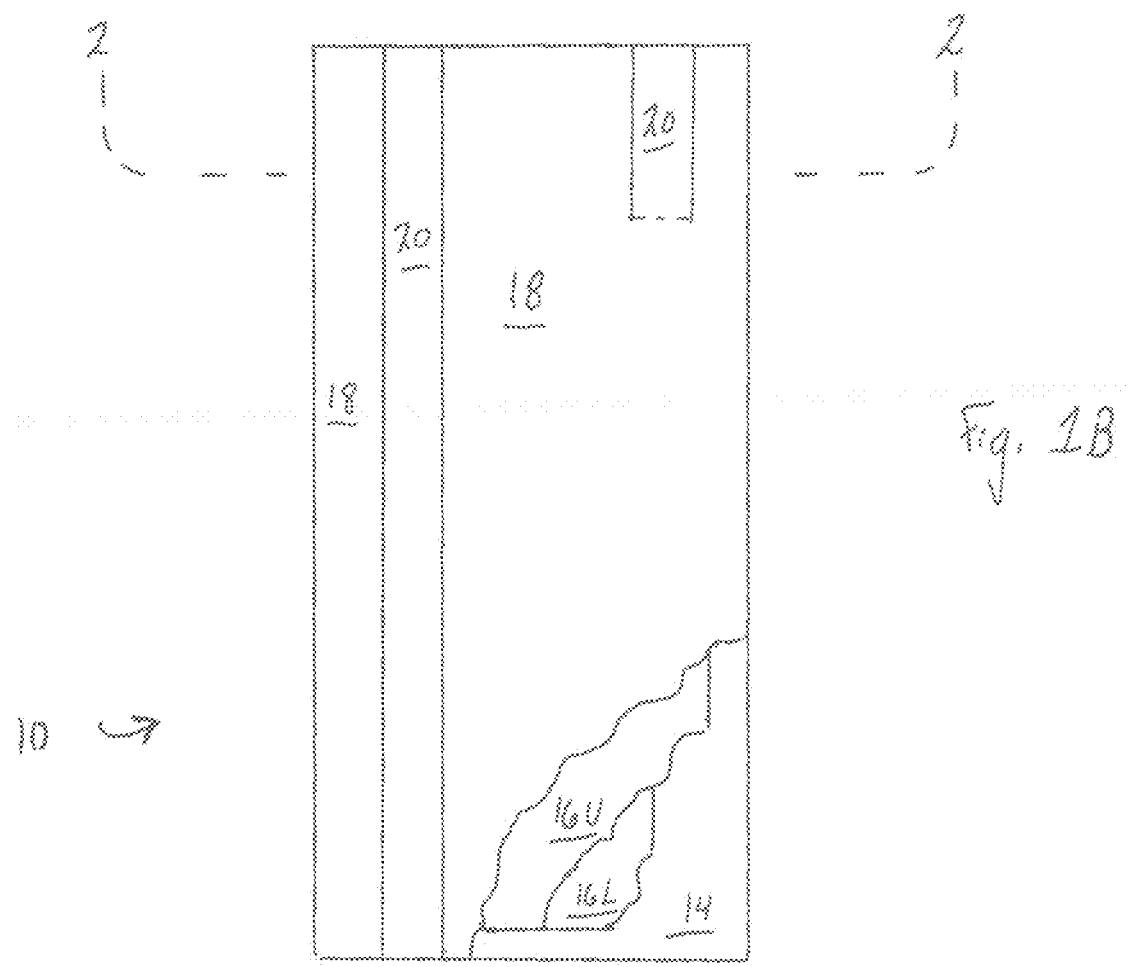

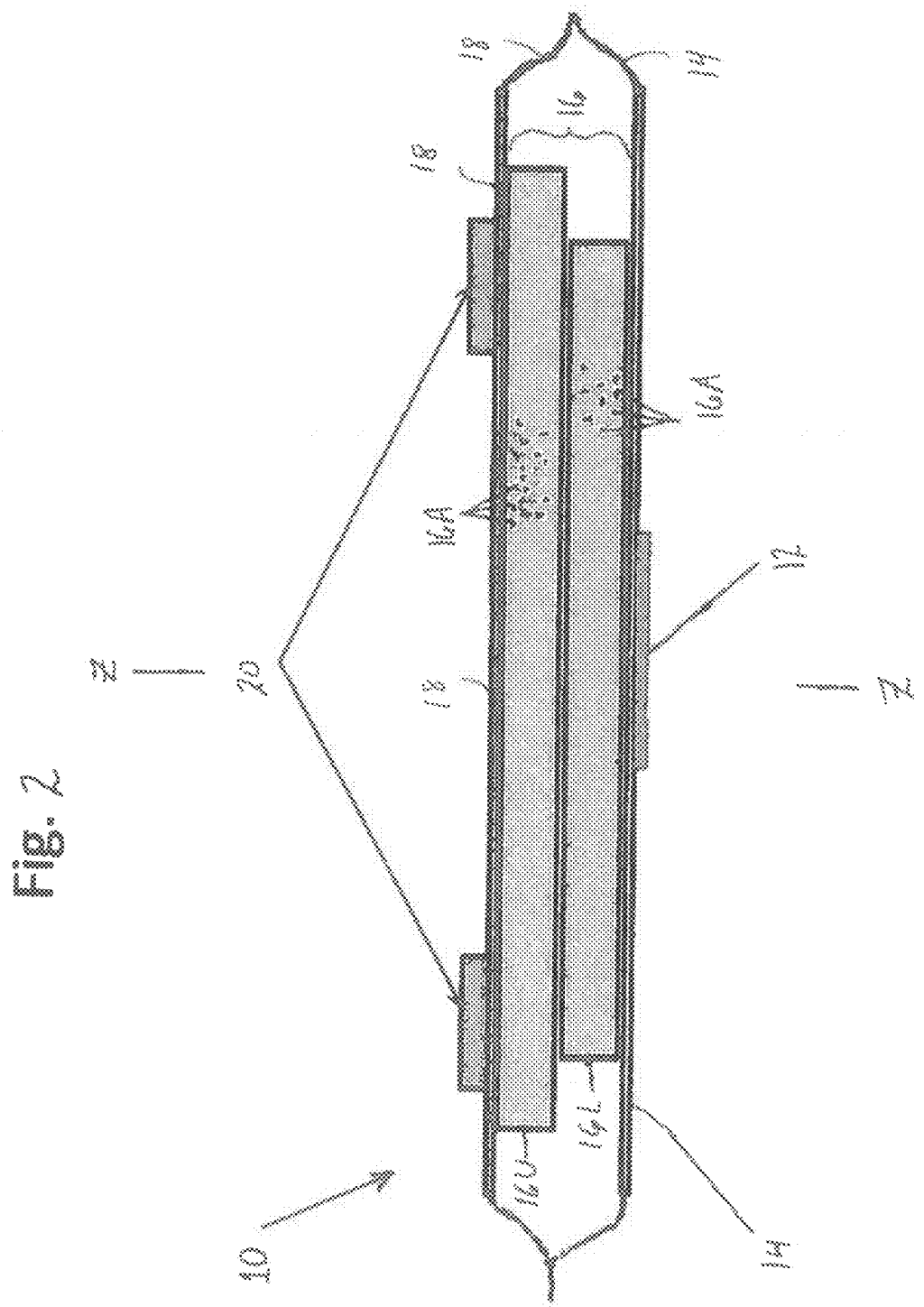

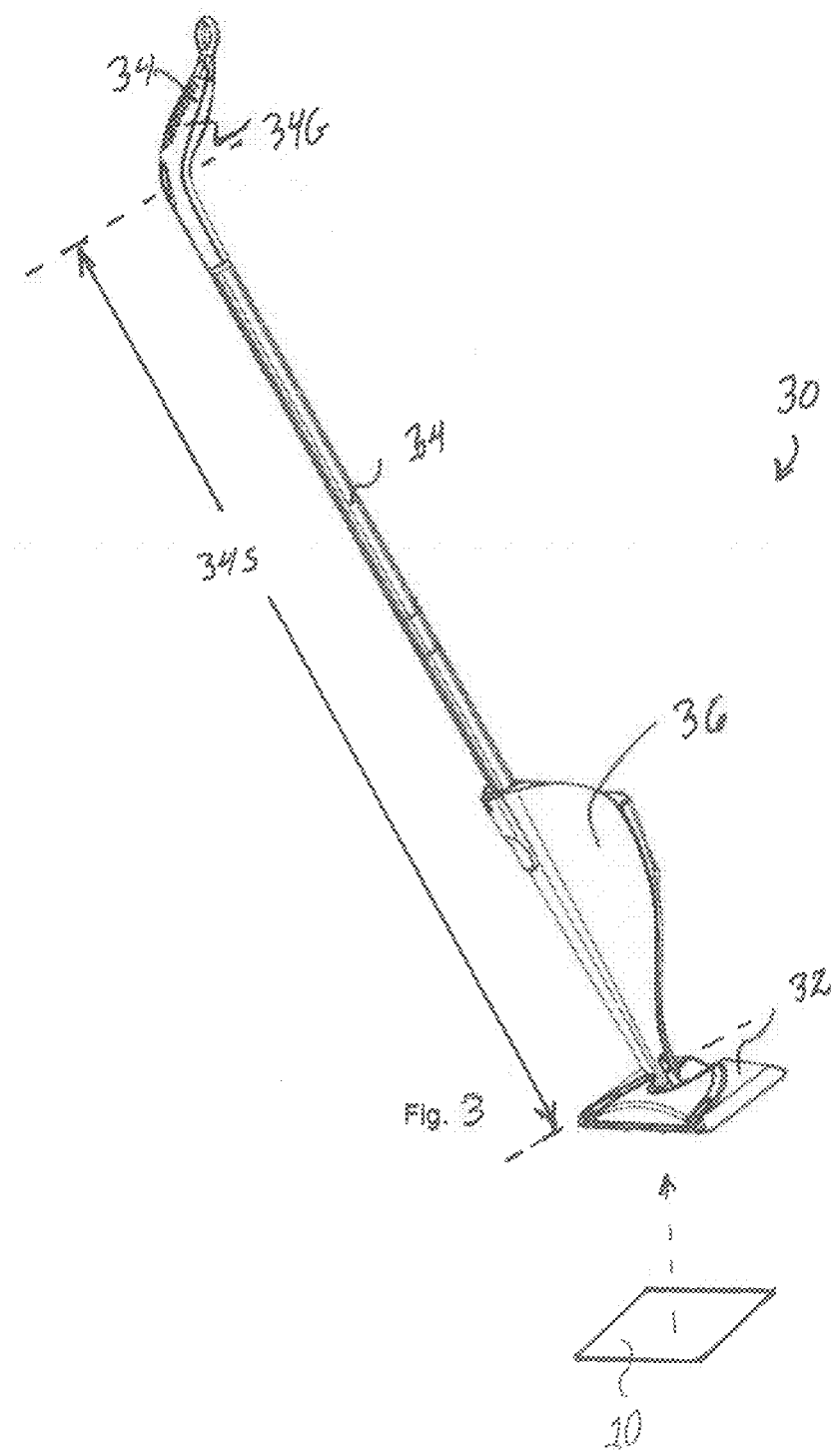

CLEANING PAD HAVING PREFERRED PERFORMANCE WITH SCRUBBING STRIP

FIELD OF THE INVENTION

The present invention relates to a cleaning pad suitable for absorbing liquid from a hard surface.

BACKGROUND OF THE INVENTION

Attempts have been made in the art to provide cleaning pads which absorb liquids, such as cleaning solutions. The liquids may be absorbed from hard surfaces, such as floors, tables and countertops. Relevant attempts in the art include US 2003/0300991, 2004/0074520, 2005/0133174, 2011/0041274, U.S. Pat. Nos. 6,003,191, 6,048,123, 6,110,848, 6,245,413, 6,601,261, 6,681,434, 6,701,567, 6,996,871, 7,037,569, 7,096,531, 7,163,349, 7,480,956, 7,458,128, 7,624,468, 8,341,797 and 8,707,505, WO200241746.

But hydrophobic floors, such as wood floors having aluminum oxide coatings, can be difficult to clean. Dark color floors and shiny floors can also be hard to clean, particularly if consumers do not use enough cleaning solution. If the consumer uses too much cleaning solution, not all of it may be absorbed and retained by the sheet during cleaning. Inadequate cleaning of debris stuck to the floor may be caused by the coefficient of friction between the cleaning pad and the floor being too low. If the coefficient of friction is too low, the cleaning pad may glide over debris stuck to the floor. Conversely, if the coefficient of friction is too great, cleaning may be difficult to manually accomplish.

To overcome the problem of the coefficient of friction being too low, and dirt not being collected, some commercially available cleaning pads have added scrubbing strips. The scrubbing strips may be textured, as shown in commonly assigned patents U.S. Pat. No. 9,204,775, D673745 and D692631 and as used with the Swiffer® WetJet™ Extra Power Pad cleaning pads.

But such scrubbing strips can create yet another problem. Such scrubbing strips may contribute to streaking or leave a haze, particularly on dark floors or hydrophobic floors. So attempting to solve one problem can create another—particularly if all floor soils are treated the same.

Accordingly, this invention seeks to decouple the problems of not having enough friction to remove debris from a floor while preventing streaking or leaving a haze on the floor.

SUMMARY OF THE INVENTION

In one embodiment the cleaning pad comprises a pad having a floor sheet, and a core joined to the floor sheet. The floor sheet also has an inwardly facing surface and an outwardly facing surface opposed thereto. The floor sheet has a combination of polymeric synthetic fibers and natural cellulose fibers. The outwardly facing surface has a surface texture less than 0.5 mm. A cleaning strip is joined to the outwardly facing surface of said floor sheet.

BRIEF DESCRIPTION OF THE DRAWINGS

FIG. 1B is a bottom plan view of the cleaning pad of FIG. 1A, shown partially in cutaway and having one attachment strip truncated for clarity.

FIG. 2 is a schematic, vertical sectional view taken along lines 2-2 of FIG. 1B.

FIG. 3 is a perspective view of a cleaning implement usable with the cleaning pad of the present invention and showing the cleaning pad in position to be removably attached to the cleaning implement.

DETAILED DESCRIPTION OF THE INVENTION

Figure 1A:
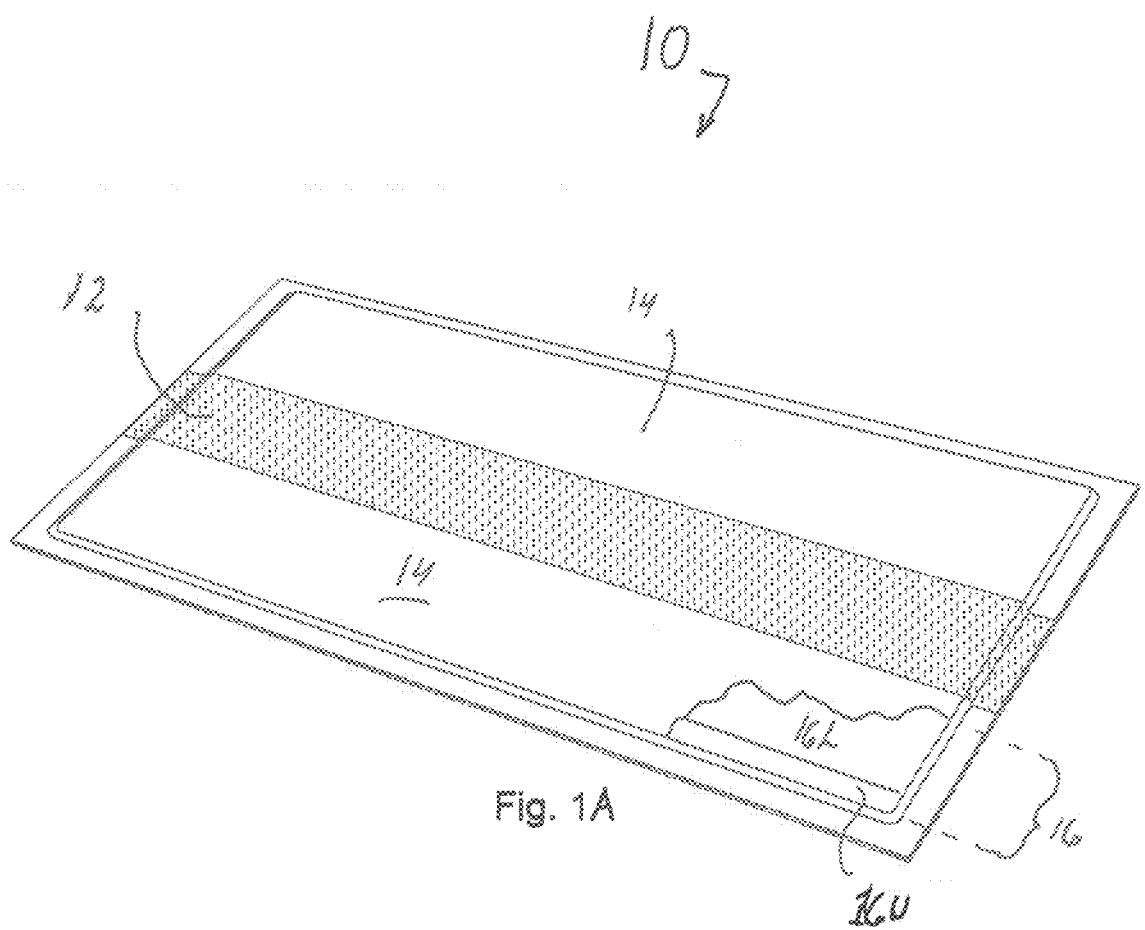
FIG. 1A to a top perspective view of an exemplary cleaning pad according to the present invention shown partially in cutaway.

Referring to FIGS. 1A, 1B and 2, the cleaning pad (10) of the present invention may comprise plural layers, to provide for absorption and storage of cleaning fluid and other liquids deposited on the target surface. The target surface will be described herein as a floor, although one of skill will recognize the invention is not so limited. The target surface can be any hard surface, such as a table or countertop, from which it is desired to absorb and retain liquids such as spill, cleaning solutions, etc.

The cleaning pad (10) may comprise a liquid pervious floor sheet (14) which contacts the floor during cleaning and preferably provides a desired coefficient of friction during cleaning. An absorbent core (16), preferably comprising absorbent gelling material (16A) (AGM) is disposed on, and optionally joined to an inwardly facing surface of the floor sheet (14). A cleaning strip (12) may be disposed on the outwardly facing surface of the floor sheet (14). Optionally, a back sheet (18) may be joined to the core (16) opposite the floor sheet (14), to provide for attachment of the cleaning pad (10) to an implement (30). The back sheet (18) may have an outwardly facing surface with one or more attachment strips (20) to particularly facilitate attachment to an implement (30). The cleaning pad (10) may be generally planar and define an XY plane and associated X, Y axes. The Z axis is perpendicular thereto and generally vertical when the cleaning pad (10) is in use on a floor.

If desired, the core (16) may comprise AGM (16A) to increase the absorbent capacity of the cleaning pad (10). The AGM (16A) may be in the form of particles may be distributed within the cleaning pad (10) in such a manner to avoid rapid absorbency and absorb fluids slowly, to provide for the most effective use of the cleaning pad (10). The AGM (16A) also entraps dirty liquid absorbed from the floor, preventing redeposition. If desired foam absorbent material or fibrous material may be incorporated into the core (16).

Examining the cleaning pad (10) in more detail, the cleaning pad (10) may comprise plural layers disposed in a laminate. The lowest, or downwardly facing outer layer, may comprise apertures to allow for transmission of liquid therethrough and to promote the scrubbing of the target surface. One, two or more core (16) layers may provide for storage of the liquids, and may comprise the absorbent gelling materials. The cleaning pad (10) may have an absorbent capacity of at least 10, 15, or 20 grams of cleaning solution per gram of dry cleaning pad (10), as set forth in commonly assigned U.S. Pat. Nos. 6,003,191 and 6,601,261.

The optional top, or upwardly facing layer, is a back sheet (18), and may be liquid impervious in order to minimize loss of absorbed fluids and to protect the user's hand if the cleaning pad (10) is used without an implement (30). The top layer may further provide for releasable attachment of the cleaning pad (10) to a cleaning implement (30). The top layer may be made of a polyolefinic film, such as LDPE. A suitable back sheet (18) comprises a PE/PP film having a basis weight of 10 to 30 gsm.

Attached to the back sheet (18) may be one or more optional attachment strips (20). The attachment strips (20)

may comprise adhesive, preferably pressure sensitive adhesive, or may loops for removable attachment to complementary hooks on an implement (30). Suitable loop attachment strips (20) may comprise a laminate of PE film and Nylon loops.

The back sheet (18) and floor sheet (14) may be peripherally joined, as is known in the art. This arrangement creates a pocket for securely holding the core (16). The core (16) may be juxtaposed with, and optionally joined to the respective inwardly facing surfaces of the floor sheet (14) and back sheet (18).

The core (16) may comprise a single layer or two or more layers. If plural layers are selected for the core (16), the width of the layers may decrease as the floor sheet (14) is approached, as shown. The core (16) may comprise airlaid cellulose and optionally polymer fiber, as available from Glatfelter of York, Pa. If two airlaid cellulose core (16) layers are selected, each layer of the core (16) may have a basis weight of at least about 75, 100, 125, 150, 175, 200, or 225 gsm and less than about 300 gsm.

Preferably each layer of the core (16) comprises AGM (16A). The AGM (16A) may absorb at least 10, 15 or 20 times its own weight. The AGM (16A) may be blown into the airlaid core (16) layer during manufacture as is known in the art. Suitable AGM (16A) is available as Z3070G from Evonik of Essen, Germany. Airlaid material containing a gradient AGM (16A) distribution is available from Glatfelter of York, Pa.

The gradient distribution AGM (16A) may be achieved by using more than one forming head. For example, an airfelt/AGM (16A) line may have three forming heads. The first head may distribute a relatively large amount of AGM (16A) relative to the cellulose distributed from that head. The second forming head may distribute a less amount of AGM (16A) relative to the cellulose base, with this mixture being laid onto top of the first AGM (16A)/cellulose base. This pattern may be repeated using as many forming heads as desired. If desired the final forming head may distribute pure cellulose and no AGM (16A). Generally the layer from each forming head does not intermix with adjacent layers. Adhesive bonding and/or thermal bonding may hold superposed layers in place and provide structural rigidity.

Suitable core (16) layers and a suitable apparatus and process for making one or more layers of a core (16) having a gradient AGM (16A) distribution are found in U.S. Pat. No. 8,603,622 issued Dec. 10, 2013. The teachings of U.S. Pat. No. 8,603,622 are incorporated herein by reference at column 5, lines 8-14 for the teaching of a suitable core (16) layer and at FIGS. 5-6, with the accompanying discussion at column 16, line 41 to column 17, line 59 for the teaching of production devices suitable to make a core (16) layer for the present invention.

If two airlaid cellulose core (16) layers are selected, the lower core layer (16L), juxtaposed with the floor sheet (14), may comprise about 10 to 20 weight percent AGM (16A), with about 15 percent being found suitable. The upper core layer (16U), juxtaposed with the optional back sheet (18), if any, may comprise about 20 to about 30 weight percent AGM (16A), with about 25 percent being found suitable. The total core (16), with all layers thereof considered, may comprise 5 to 50 w %, or 10 to 45 w % AGM (16A), the amount and gradient distribution of AGM (16A) being found helpful for the present invention. The percentage of AGM (16A), as described and claimed herein refers to the weight percentage of AGM (16A) in that particular core (16) layer (16U or 16L), without regard to the floor sheet (14), back sheet (18), cleaning strip (12) or attachment strips (20).

Each core layer (16L, 16U) and particularly the upper core layer (16U) may be further stratified to provide greater absorbency benefit. The upper core layer (16U) may have three strata, as formed. The strata may comprise 0, 25, and 50 weight percent, monotonically increasing as the back sheet (18), if any, is approached, to provide a gradient distribution.

Generally it is desired that the upper core layer (16U) comprise more AGM (16A), on both an absolute basis and a weight percentage basis than the lower core layer (16L). The arrangement provides the benefit that gel blocking in the lower core layer (16L) does not prevent full absorption of liquid from the target surface and that liquids are transported upwardly and away from the floor sheet (14).

Any arrangement that provides more AGM (16A), preferably on an absolute basis or optionally on a weight percentage basis is suitable. Alternatively, either core (16) layer or a single core (16) layer may have increasing AGM (16A) concentration in the Z direction.

Any such process, as is known in the art, or arrangement, which provides for increasing AGM (16A) in the Z direction as the back sheet (18) is approached is herein considered an AGM (16A) gradient. It is to be recognized that the AGM (16A) gradient may be smooth, comprise one or more stepwise increments or any combination thereof.

The floor sheet (14) may comprise a combination of spunbond (SB) fibers and a natural cellulose fibers. Natural cellulose fibers are preferred over Rayon fibers. The SB fibers and cellulose fibers may be combined through hydroentangling. The floor sheet (14) may have a basis weight of 20 to 70 gsm, and preferably 30 to 50 gsm.

The floor sheet (14) may have a surface texture less than 0.5 mm, 0.4 mm or less than 0.3 mm and even be essentially 0 mm. The floor sheet (14) may have a coefficient of friction with amine oxide solution, as described below of 0.2 to 0.5, and more particularly 0.3 to 0.4. It is believed this combination of properties leads to efficacious cleaning while minimizing streaks and hazing.

But the inventors have further found that the orientation of the natural cellulose/spunbond material used for the floor sheet (14) contributes a role to the friction between the cleaning pad and the floor.

More particularly, a floor sheet (14) may comprise a laminate, having a lamina of cellulose fibers and a lamina of synthetic fibers, particularly spunbond synthetic fibers and more particularly polyester spunbond synthetic fibers. Such a laminate is believed to be helpful in attaining the performance of the cleaning pads (10) described herein. The cellulose fiber lamina may be outwardly facing, to provide friction and absorbency on the floor. The synthetic fiber layer may be positioned in contacting relationship with the core (16) to provide integrity during use.

Further, it is believed that having the cellulose fibers of the floor sheet (14) contact the floor during sweeping motion provides a charge to the floor useful for retaining hair and similarly charged dirt during cleaning.

To provide adequate cleaning of dirt on a floor without undue friction, a cleaning pad (10) according to the present invention may have a coefficient of friction with amine oxide of at least 0.2 or 0.3 and less than 0.5 or 0.4. It is believed that such a coefficient of friction is obtained with the combination of floor sheet (14) and cleaning strip (12) described herein.

A 23 gsm tissue and 17 gsm polypropylene spunbond hydroentagled, sold as 40 gsm Genesis tissue by Suominen of Helsinki, Finland has been found to be a suitable floor sheet (14).

Another suitable floor sheet (14) may comprise 28 gsm tissue and 17 gsm polypropylene spunbond hydroentagled, sold as 45 gsm Hydratexture tissue by Suominen.

The floor sheet (14) may further comprise a cleaning strip (12). The cleaning strip (12) may have a width less than the floor sheet (14) and may comprise at least about 10, 20, 30, 40, 50, 60 or 70% of the floor sheet (14) width, so that some of the floor sheet (14) is exposed to the floor during cleaning. The cleaning strip (12) may have a width of at least 10, 20, 30, 40, or 50 mm and a width less than 70, 80, 100, 200 or 300 mm, with a width of 24 to 44 mm being suitable and a width of 34 mm being preferred. The cleaning strip (12) may comprise a single lamina.

The cleaning strip (12) may be hydrophilic or hydrophobic. As used herein hydrophilic means having a contact angle of 0 to 100 degrees. The cleaning strip (12) may particularly have a contact angle of 30 to 100 degrees and more particularly 55 to 90 degrees. The cleaning strip (12) may comprise at least 50% cellulosic content to be hydrophilic. A hydrophobic cleaning strip (12) has a contact angle of 100 to 170 degrees.

One option is to provide a cleaning strip (12) for smoothing any cleaning liquid residue may have a surface texture less than 0.5 mm, 0.4 mm or less than 0.3 mm and even be essentially 0 mm. A surface texture of less than 0.5 mm is believed to minimize streaking during cleaning, particularly when the floor dries and more particularly when a dark floor dries.

Preferably the cleaning pad (10) according to the present invention has a cleaning strip (12) for scrubbing and removing particulates from the floor. Such a cleaning strip (12) may have a surface texture of 1 to 6 mm, 1 to 4 mm, 1 to 3 mm, and more particularly 2 to 3 mm, with a surface texture of about 2.5 mm being found suitable. Surface texture is measured as the peak to valley distance, independent of the cleaning strip (12) thickness, as described below. Generally, the surface texture of the cleaning strip (12) may advantageously be greater than the surface texture of the floor sheet (14). The texture may be imparted through interengaged forming rolls as shown in commonly assigned U.S. Pat. Nos. 5,916,661 and 6,383,431, using zero strain laminate as described in commonly assigned U.S. Pat. No. 5,143,679.

The cleaning strip (12) material may have an MD elongation at break of 80 to 150%, 100 to 130% or 110 to 120%. The cleaning strip (12) may have a basis weight of 40 to 60 gsm. The cleaning strip (12) material may have a denier of 1.5 to 4, and particularly about 2.2. Suitable material for a preferred cleaning strip (12) is polyester spunbond available from Berry Plastics of Evansville, Ind.

A suitable cleaning strip (12) may comprise may comprise, consist of or consist essentially of nonwoven synthetic materials, such as polypropylene, polyethylene, LDPE, polyesters, polyamides and PET. A preferred cleaning strip (12) comprises spunbond polyester (SBPE), as available from Berry Plastics of Evansville, Ind. under the name Reemay® 2214.

Without being bound by theory it is believed that the advantageous combination of a floor sheet (14) comprising a laminate of natural cellulose and synthetic nonwoven fibers, used with a nonwoven cleaning strip (12) having the described surface texture provides a particularly efficacious cleaning experience having both adequate friction and scrubbing capability. The cleaning is believed to be particularly efficacious if the laminate of natural cellulose and synthetic nonwoven fibers used for the floor sheet (14) has the natural cellulose fibers facing outwardly. The cleaning is also believed to be particularly efficacious if the cleaning strip (12) has a surface texture of at least 0.8 mm and/or comprises polyester.

If desired, the cleaning strip (12) may have a color which contrasts with that of the floor sheet (14). This arrangement provides the benefit of a signal to the consumer that the cleaning strip (12) and floor sheet (14) have different functionalities.

Surface Texture Measurement

The texture outwardly facing surface of the cleaning strip (12) is measured while the cleaning strip (12) is still attached to the balance of the cleaning pad (10). The cleaning pad (10) is cut, parallel to the width dimension of the cleaning pad (10) using a sharp knife in a manner that is not injurious to the texture of the floor sheet (14) or cleaning strip (12). The sample is viewed from the edge, so that a cross sectional view of the cut plane can be measured.

The surface texture topography of the cleaning strip (12) is determined to the nearest 0.01 mm, by measuring a linear distance along an axis perpendicular to the floor-facing planar surface of the cleaning strip (12). The distance to be measured is the vertical span, perpendicular to the plane of the cleaning strip (12), between the bottom of a valley and the top of an adjacent peak, wherein both endpoints are located on the floor-facing surface of the cleaning strip (12). Distances are measured using the Point to Point measurement function or equivalent.

This procedure is repeated for a total of n=1 measurements on each of five different cleaning pads (10). The five results are averaged to determine the surface texture for the cleaning strip (12).

A suitable digital microscope for making the measurements is a Nikon SMZ1500 with the Nikon TV Lens C-0.6×, having an Infinity 2 Camera from Lumenera Corporation of Ottawa, Canada. Suitable measurement software includes INFINITY ANALYZE, Release 5.0.3 from Lumenera Corporation.

Coefficient of Friction Measurement

The coefficient of friction of a material is the resistive force of friction divided by the normal or perpendicular force pushing the material against a surface. The coefficient of friction test method uses a Friction/Peel Tensile Tester, Model Insight 10 from MTS System Corporation of Eden Prairie, MN to measure the kinetic coefficient of friction.

A 225 g sled, with dimensions of 6.5 cm×11.0 cm×1.5 cm and having hook fasteners on the bottom surface is provided. A first sample of the cleaning pad (10) is attached to the sled using the hooks. If the cleaning is larger than the sled, the cleaning pad (10) is centered and trimmed to fit, so that an edge of the cleaning pad (10) does not fold during testing. If a smaller cleaning pad (10) is used, the cleaning pad (10) is centered on the sled. The pressure of the sled is about 3.15 g/cm$^2$. This pressure simulates the typical pressure applied to a cleaning pad (10) by a lightweight mop while a user is cleaning a floor.

The test solution comprises 0.5 w % ethanol and 0.04 w % amine oxide, CAS number 70592-80-2, dissolved in a balance of de-ionized water. The nominal balance is 99.46 w % de-ionized water.

The test surface is a plank of engineered hardwood, smooth to the touch, particularly Home Legend Santos Engineered Hardwood, UPC 664646301473, 10 cm wide× 28 cm long. The sled and test surface are cleaned using the aforementioned 80/20 IPA/water solution. The instrument is set up as follows:

1. Set the "Sled Weight" to 225 g.
2. Set the "Data Acq. Rate" to 20 Hz.

3. Set the "Begin Point" to 10 mm.
4. Set the "End Point" to 130 mm.
5. Set the "Extension Limit High" to 135 mm.
6. Set the "Crosshead" speed to 1000 mm/min.
7. "Return" the load cell to the starting point for test.
8. There are three test options:
Dry cof: To test a dry sample, proceed to next step.
1.0 ml cof Test: To test with solution in front of sample: Add 1.0 mL of cleaning solution to the engineered wood plank using a volumetric pipette, 1 cm in front of the sample. The solution should be applied to an area about 50 mm in width (the width being defined as the dimension perpendicular to the forward movement direction of the sled) by 20 mm in length (the length being defined as the dimension parallel to the direction of the sled in motion)
25 ml cof Test: To test a saturated cleaning pad (10) sample: Apply 25 mL of cleaning solution to the floorsheet (14) of the cleaning pad (10). Solution should be added at a rate that allows the solution to be absorbed into the cleaning pad (10) and not be splashed off. The cleaning pad (10) sample then sits on a horizontal surface with the floorsheet (14) facing upwards for 5 minutes before beginning the test.
9. Place the first sample and sled on top of the engineered wood plank at about 5 mm from back edge of the test surface such that the sled is lined up at the center of the path where the hook on the sled lines up with the eyelet of the load cell.
10. Attach the sled to the load cell by passing a string through the pulley and up to the clamp on the test apparatus. Close the clamp on the string to secure it.
11. Initiate test by pressing the "play" icon. The load cell starts moving from the back to the front dragging the sled and the test sample.
12. When the test is complete, the load cell stops and the program will display the measure of the Static Coefficient of Friction (ST) as well as the Kinetic Coefficient of Friction (KI). Record the Kinetic Coefficient of Friction measurement. Activate the "Return" button so that the sled with the sample returns to the starting position.
13. Repeat this procedure for n=4 samples and average the results.

EXAMPLES

The cleaning pad (10) of the present invention was tested against commercially available Swiffer® WetJet™ Extra Power cleaning pads and Swiffer® WetJet™ cleaning pads, both sold by the instant assignee. Swiffer® WetJet™ Extra Power cleaning pads use a SB polyester cleaning strip (12). The test solution comprised amine oxide and ethanol as described herein.

The Swiffer® WetJet™ Extra Power cleaning pads (control 1) utilized a 60 gsm PE/PP discrete apertured spunbond nonwoven available as SofSpan from Fitsea of Simpsonville, S.C. floor sheet (14) and a 46 gsm spunbond polyester available as Reemay from Berry Plastics of Evansville, Ind. cleaning strip (12).

The Swiffer® WetJet™ cleaning pads (control 2) utilized the same floor sheet (14) as above and a 23 gsm tissue and 17 gsm polypropylene hydroentangled SB, sold as 40 gsm Genesis tissue by Suominen of Helsinki, Finland, for the cleaning strip (12).

The Invention utilized a 23 gsm tissue and 17 gsm polypropylene spunbond hydroentagled, sold as 40 gsm Genesis tissue by Suominen of Helsinki, Finland floor sheet (14), and the same cleaning strip (12) as the Swiffer® WetJet™ Extra Power cleaning pads (control 1).

Each of the trials below used a common core (16) and back sheet (18). The particular core (16) construction had a compound gradient distribution of AGM (16A) within the core. The upper core layer (16U) had 25 w % AGM. The lower core layer (16L) had 15 w % AGM.

The coefficients of friction were tested, using dry, slightly wetted and more wetted test conditions. The results show that the cleaning pads (10) according to the present invention have a 25 ml coefficient of friction between 0.2 and 0.5, more particularly and advantageously between 0.3 and 0.4. These results are shown in Table 1, for a population of n=4 samples for each test.

TABLE 1

| Kinetic CoF | Dry CoF | 1 mL Solution dosed to Front Edge of Dry Cleaning Pad CoF | 25 mL Solution Allowed to Soak in to Cleaning Pad CoF |
|---|---|---|---|
| Swiffer® WetJet ™ Extra Power cleaning pad (control 1) | 0.16 | 0.15 | 0.19 |
| Invention having floor sheet (14) with cellulose facing the floor | 0.14 | 0.20 | 0.32 |
| Invention having floor sheet (14) with SB facing the floor | 0.15 | 0.24 | 0.34 |

As shown in Table 1, the control and a cleaning pad (10) according to the present invention have substantially the same dry coefficient of friction. Further, an amine oxide solution applied at two different dosing levels had very little effect on the control cleaning pad. But the same dosing advantageously increased the 25 ml wet friction for the pad according to the invention from 0.14-0.15 to 0.32-0.34 for a cleaning pad (10) according to the invention.

A cleaning pad (10) according to the present invention was also tested for cleaning performance against two control cleaning pads (10). A population of n=1 of each sample cleaning pad (10) was tested on a hardwood floor with 0.06 gsm and graded for streaking, hazing, change (improvement in gloss) and the amount of fluid absorbed form the test floor. The results are shown in Table 2.

TABLE 2

| | Avg. Streak Grade (lower is better) | Avg. Haze Grade (lower is better) | Avg. Delta Gloss (lower is better) | Absorbency (higher is better) |
|---|---|---|---|---|
| Test Solution | Amine oxide | Amine oxide | Swiffer® WetJet ™ Multi-Surface Cleaner Solution | Swiffer® WetJet ™ Multi-Surface Cleaner Solution |
| Control 1: Swiffer® WetJet ™ Extra Power | 3.0 | 3.2 | 22.1 | 25.5% |

TABLE 2-continued

| | Avg. Streak Grade (lower is better) | Avg. Haze Grade (lower is better) | Avg. Delta Gloss (lower is better) | Absorbency (higher is better) |
|---|---|---|---|---|
| cleaning pad Control 2: Swiffer ® WetJet ™ cleaning pad | 2.0 | 1.9 | 17.1 | 32.6% |
| Invention | 1.8 | 2.4 | 22.5 | 20.5% |

Table 2 shows that the invention provided improvements in both streaking and hazing, as reflected in the gloss improvements relative to both controls.

The improvement relative to the controls is unexpected, as the same material was used for the cleaning strip (12) of Control 1 as the floor sheet (14) of the present invention. Further, the same material was used for the cleaning strip (12) of both Control 2 and the present invention. Thus, it is not predicted the present invention would outperform both Control 1 and Control 2 for both streaking and hazing.

Implement (30)

The cleaning pad (10) according to the present invention may be used by hand or with a cleaning implement (30). Referring to FIG. 3, the cleaning implement (30) may comprise a plastic head (32) for holding the cleaning pad (10) and an elongate handle (34) articulably connected thereto. The handle (34) may comprise a metal or plastic tube or solid rod. A grip (34G) may be disposed on the end of the handle (34) for ergonomics. The effective length (34S) of the handle (34) may be adjusted as necessary.

The head (32) may have a downwardly facing surface, to which the cleaning pad (10) may be attached. The downwardly facing surface may be generally flat, or slightly convex. The head (32) may further have an upwardly facing surface. The upwardly facing surface may have a universal joint to facilitate connection of the elongate handle (34) to the head (32).

A hook and loop system may be used to attach the cleaning pad (10) directly to the bottom of the head. Alternatively, the upwardly facing surface may further comprise a mechanism, such as resilient grippers, for removably attaching the cleaning pad (10) to the implement (30). If grippers are used with the cleaning implement (30), the grippers may be made according to commonly assigned U.S. Pat. Nos. 6,305,046; 6,484,346; 6,651,290 and/or D487,173.

The cleaning implement (30) may further comprise a reservoir for storage of cleaning solution. The reservoir may be replaced when the cleaning solution is depleted and/or refilled as desired. The reservoir may be disposed on the head (32) or the handle (34) of the cleaning implement (30). The neck of the reservoir may be offset per commonly assigned U.S. Pat. No. 6,390,335. The cleaning solution contained therein may be made according to the teachings of commonly assigned U.S. Pat. No. 6,814,088.

The cleaning implement (30) may further comprise a pump for dispensing cleaning solution from the reservoir onto the target surface, such as a floor. The pump may be battery powered or operated by line voltage. Alternatively, the cleaning solution may be dispensed by gravity flow. The cleaning solution may be sprayed through one or more nozzles to provide for distribution of the cleaning solution onto the target surface in an efficacious pattern.

If a replaceable reservoir is utilized, the replaceable reservoir may be inverted to provide for gravity flow of the cleaning solution. Or the cleaning solution may be pumped to the dispensing nozzles. The reservoir may be a bottle, and may be made of plastic, such as a polyolefin. The cleaning implement (30) may have a sleeve (36), which removably receives the bottle, or other reservoir. The cleaning implement (30) may have a needle, optionally disposed in the sleeve (36) to receive the cleaning solution from the bottle. The bottle may have a needle piercable membrane, complementary to the needle, and which is resealed to prevent undesired dripping of the cleaning solution during insertion and removal of the replaceable reservoir. Alternatively or additionally, If desired, the implement (30) may also provide for steam to be delivered to the cleaning pad (10) and/or to the floor or other target surface.

A suitable reservoir of cleaning solution and fitment therefor may be made according to the teachings of commonly assigned U.S. Pat. Nos. 6,386,392, 7,172,099; D388, 705; D484,804; D485,178. A suitable cleaning implement (30) may be made according to the teachings of commonly assigned U.S. Pat. Nos. 5,888,006; 5,960,508; 5,988,920; 6,045,622; 6,101,661; 6,142,750; 6,579,023; 6,601,261; 6,722,806; 6,766,552; D477,701 and/or D487,174. A steam implement (30) may be made according to the teachings of jointly assigned 2013/0319463.

A. A cleaning pad (10) comprising:
an absorbent core (16) comprising natural cellulose material,
a liquid pervious floor sheet (14) joined to said absorbent core (16), said floor sheet (14) comprising a laminate of spunbond fibers and natural cellulose fibers, said floor sheet (14) having an inwardly oriented surface facing said core (16) and an outwardly oriented surface opposed thereto, and
a cleaning strip (12) joined to said outwardly facing surface of said floor sheet (14), said cleaning strip (12) comprising polyester material and having a surface texture of 1 to 3 mm.

B. A cleaning pad (10) according to paragraph A wherein said floor sheet (14) is hydroentangled and further comprising a back sheet (18), said back sheet (18) being joined to said core (16) whereby said core (16) is disposed between said back sheet (18) and said floor sheet (14).

C. A cleaning pad (10) according to paragraphs A and B wherein said cleaning strip (12) has a surface texture of 2 to 3 mm.

D. A cleaning pad (10) according to paragraphs A, B and C further comprising from 5 to 50 w % absorbent gelling material (16A) in said core (16).

E. A cleaning pad (10) according to paragraphs A, B, C and D further comprising a back sheet (18), said back sheet (18) being joined to said core (16) whereby said core (16) is disposed between said back sheet (18) and said floor sheet (14),
said floor sheet (14) having a surface texture less than 0.5 mm, and said cleaning strip (12) having a width of 30 to 70 mm and comprising spunbond polyester.

F. A cleaning pad (10) according to paragraphs A, B, C, D and E further comprising a back sheet (18), said back sheet (18) being joined to said core (16) whereby said core (16) is disposed between said back sheet (18) and said floor sheet (14),
said floor sheet (14) having a surface texture less than 0.3 mm.

G. A cleaning pad (10) according to paragraphs A, B, C, D, E, F and G further comprising a back sheet (18), said back sheet (18) being joined to said core (16) whereby said core (16) is disposed between said back sheet (18) and said floor sheet (14), said core (16) further comprising absorbent gelling material (16A) therein and having a gradient distribution of absorbent gelling material (16A), with absorbent gelling material (16A) percentage decreasing as said floor sheet (14) is approached, said floor sheet (14) comprising a laminate of spunbond fibers and natural cellulose fibers, with said natural cellulose fibers facing outward from said cleaning pad (10) and said spunbond fibers facing said core (16), and a cleaning strip (12) comprising a nonwoven, said cleaning strip (12) having a width of 20 to 80 mm.

H. A cleaning pad (10) comprising:
a back sheet (18),
a liquid pervious floor sheet (14) joined to said absorbent core (16), said floor sheet (14) comprising both spunbond polyester fibers and natural cellulose fibers, said floor sheet (14) having an inwardly oriented surface facing said core (16) and an outwardly oriented surface opposed thereto,
an absorbent core (16) disposed between said floor sheet (14) and said back sheet (18), said absorbent core (16) comprising absorbent gelling material (16A) therein,
and
a spunbond nonwoven cleaning strip (12) joined to said outwardly facing surface of said floor sheet (14), and having a surface texture of 1 to 3 mm.

I. A cleaning pad (10) according to paragraph H wherein said cleaning strip (12) comprises a hydrophobic polyester nonwoven.

J. A cleaning pad (10) according to paragraphs H and I having a 25 ml coefficient of friction with amine oxide of 0.2 to 0.5.

K. A cleaning pad (10) according to paragraphs H, I and J having a 25 ml coefficient of friction with amine oxide of 0.3 to 0.4.

L. A cleaning pad (10) according to paragraphs H, I, J and K having a 25 ml coefficient of friction with amine oxide of 0.2 to 0.5 and comprising from 5 to 50 w % absorbent gelling material (16A) in said core (16), and having a gradient distribution of absorbent gelling material (16A), with absorbent gelling material (16A) percentage decreasing as said floor sheet (14) is approached.

M. A cleaning pad (10) according to paragraphs H, I, J, K and L having a 25 ml coefficient of friction with amine oxide of 0.3 to 0.4 and comprising from 5 to 50 w % absorbent gelling material (16A) in said core (16), and having a gradient distribution of absorbent gelling material (16A), with absorbent gelling material (16A) percentage decreasing as said floor sheet (14) is approached, said cleaning strip (12) comprising polyester.

N. A cleaning pad (10) according to paragraphs H, I, J, K, L and M having a 25 ml coefficient of friction with amine oxide of 0.2 to 0.5 and comprising from 5 to 50 w % absorbent gelling material (16A) in said core (16), and having a gradient distribution of absorbent gelling material (16A), with absorbent gelling material (16A) percentage decreasing as said floor sheet (14) is approached, said cleaning strip (12) comprising polyester, said back sheet (18) being liquid impervious.

O. A cleaning pad (10) comprising:
a back sheet (18),
a liquid pervious floor sheet (14) joined to said absorbent core (16), said floor sheet (14) comprising both spunbond fibers and natural cellulose fibers, said floor sheet (14) having an inwardly oriented surface facing said core (16) and an outwardly oriented surface opposed thereto,
an absorbent core (16) disposed between said floor sheet (14) and said back sheet (18), said absorbent core (16) comprising from 5 to 50 w % absorbent gelling material (16A) in said core (16) therein,
and
a nonwoven cleaning strip (12) joined to said outwardly facing surface of said floor sheet (14), and having a surface texture of 1 to 3 mm,
said cleaning pad (10) having a 25 ml coefficient of friction with amine oxide of 0.2 to 0.5.

P. A cleaning pad (10) according to paragraph O wherein said floor sheet (14) has a surface texture of less than 0.3 mm.

Q. A cleaning pad (10) according to paragraphs O and P wherein said floor sheet (14) has a surface texture of less than 0.3 mm, said floor sheet (14) comprising a laminate of spunbond fibers and natural cellulose fibers, with said natural cellulose fibers facing outward from said cleaning pad (10) and said spunbond fibers facing said core (16).

R. A cleaning pad (10) according to paragraphs O, P and Q wherein said floor sheet (14) has a surface texture of about 0 mm, said floor sheet (14) comprising a laminate of spunbond fibers and natural cellulose fibers, with said natural cellulose fibers facing outward from said cleaning pad (10) and said spunbond fibers facing said core (16).

S. A cleaning pad (10) according to paragraphs O, P, Q and R wherein said floor sheet (14) has a surface texture of less than 0.3 mm and said cleaning pad (10) has a 25 ml coefficient of friction of 0.3 to 0.4.

T. A cleaning pad (10) according to paragraphs O, P, Q, R and S wherein said floor sheet (14) has a surface texture of less than 0.3 mm, said floor sheet (14) comprising a laminate of spunbond fibers and natural cellulose fibers, with said natural cellulose fibers facing outward from said cleaning pad (10) and said spunbond fibers facing said core (16) and said cleaning pad (10) has a 25 ml coefficient of friction of 0.3 to 0.4.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" whether or not the term 'about' is expressly recited. Every range disclosed herein includes all endpoints of that range whether disclosed within that range or as part of a related range. Thus two endpoints of the same range may be disclosed as endpoints of broader or narrower ranges. The common mathematical symbols > and < mean greater than or equal to and less than or equal to, respectively, and include the endpoints set forth in the equations and inequalities below.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning pad comprising:
   an absorbent core comprising natural cellulose material,
   a liquid pervious floor sheet joined to said absorbent core, said floor sheet comprising a laminate of spunbond fibers and natural cellulose fibers, said floor sheet having an inwardly oriented surface facing said core and an outwardly oriented surface opposed thereto, and
   a cleaning strip joined to said outwardly facing surface of said floor sheet, said cleaning strip comprising polyester material and having a surface texture of 1 to 3 mm.

2. A cleaning pad according to claim 1 wherein said floor sheet is hydroentangled and further comprising a back sheet, said back sheet being joined to said core whereby said core is disposed between said back sheet and said floor sheet.

3. A cleaning pad according to claim 1 wherein said cleaning strip has a surface texture of 2 to 3 mm.

4. A cleaning pad according to claim 1 further comprising from 5 to 50 w % absorbent gelling material in said core.

5. A cleaning pad according to claim 1 further comprising a back sheet, said back sheet being joined to said core whereby said core is disposed between said back sheet and said floor sheet,
   said floor sheet having a surface texture less than 0.5 mm, and
   said cleaning strip having a width of 30 to 70 mm and comprising spunbond polyester.

6. A cleaning pad according to claim 1 further comprising a back sheet, said back sheet being joined to said core whereby said core is disposed between said back sheet and said floor sheet,
   said floor sheet having a surface texture less than 0.3 mm.

7. A cleaning pad according to claim 1 further comprising a back sheet, said back sheet being joined to said core whereby said core is disposed between said back sheet and said floor sheet,
   said core further comprising absorbent gelling material therein and having a gradient distribution of absorbent gelling material, with absorbent gelling material percentage decreasing as said floor sheet is approached,
   said floor sheet comprising a laminate of spunbond fibers and natural cellulose fibers, with said natural cellulose fibers facing outward from said cleaning pad and said spunbond fibers facing said core, and
   a cleaning strip comprising a nonwoven, said cleaning strip having a width of 20 to 80 mm.

8. A cleaning pad comprising:
   a back sheet,
   a liquid pervious floor sheet joined to said absorbent core, said floor sheet comprising both spunbond polyester fibers and natural cellulose fibers, said floor sheet having an inwardly oriented surface facing said core and an outwardly oriented surface opposed thereto,
   an absorbent core disposed between said floor sheet and said back sheet, said absorbent core comprising absorbent gelling material therein,
   and
   a spunbond nonwoven cleaning strip joined to said outwardly facing surface of said floor sheet, and having a surface texture of 1 to 3 mm.

9. A cleaning pad according to claim 8 wherein said cleaning strip comprises a hydrophobic polyester nonwoven.

10. A cleaning pad according to claim 8 having a 25 ml coefficient of friction with amine oxide of 0.2 to 0.5.

11. A cleaning pad according to claim 8 having a 25 ml coefficient of friction with amine oxide of 0.3 to 0.4.

12. A cleaning pad according to claim 8 having a 25 ml coefficient of friction with amine oxide of 0.2 to 0.5 and comprising from 5 to 50 w % absorbent gelling material in said core, and having a gradient distribution of absorbent gelling material, with absorbent gelling material percentage decreasing as said floor sheet is approached.

13. A cleaning pad according to claim 8 having a 25 ml coefficient of friction with amine oxide of 0.3 to 0.4 and comprising from 5 to 50 w % absorbent gelling material in said core, and having a gradient distribution of absorbent gelling material, with absorbent gelling material percentage decreasing as said floor sheet is approached, said cleaning strip comprising polyester.

14. A cleaning pad according to claim 8 having a 25 ml coefficient of friction with amine oxide of 0.2 to 0.5 and comprising from 5 to 50 w % absorbent gelling material in said core, and having a gradient distribution of absorbent gelling material, with absorbent gelling material percentage decreasing as said floor sheet is approached, said cleaning strip comprising polyester, said back sheet being liquid impervious.

15. A cleaning pad comprising:
   a back sheet,
   a liquid pervious floor sheet joined to said absorbent core, said floor sheet comprising both spunbond fibers and natural cellulose fibers, said floor sheet having an inwardly oriented surface facing said core and an outwardly oriented surface opposed thereto,
   an absorbent core disposed between said floor sheet and said back sheet, said absorbent core comprising from 5 to 50 w % absorbent gelling material in said core therein,
   and
   a nonwoven cleaning strip joined to said outwardly facing surface of said floor sheet, and having a surface texture of 1 to 3 mm,
   said cleaning pad having a 25 ml coefficient of friction with amine oxide of 0.2 to 0.5.

16. A cleaning pad according to claim 15 wherein said floor sheet has a surface texture of less than 0.3 mm.

17. A cleaning pad according to claim 15 wherein said floor sheet has a surface texture of less than 0.3 mm, said floor sheet comprising a laminate of spunbond fibers and natural cellulose fibers, with said natural cellulose fibers facing outward from said cleaning pad and said spunbond fibers facing said core.

18. A cleaning pad according to claim 15 wherein said floor sheet has a surface texture of about 0 mm, said floor sheet comprising a laminate of spunbond fibers and natural cellulose fibers, with said natural cellulose fibers facing outward from said cleaning pad and said spunbond fibers facing said core.

19. A cleaning pad according to claim 15 wherein said floor sheet has a surface texture of less than 0.3 mm and said cleaning pad has a 25 ml coefficient of friction of 0.3 to 0.4.

20. A cleaning pad according to claim 15 wherein said floor sheet has a surface texture of less than 0.3 mm, said floor sheet comprising a laminate of spunbond fibers and natural cellulose fibers, with said natural cellulose fibers facing outward from said cleaning pad and said spunbond fibers facing said core and said cleaning pad has a 25 ml coefficient of friction of 0.3 to 0.4.

* * * * *